United States Patent
Kleinpenning

(10) Patent No.: US 11,056,978 B2
(45) Date of Patent: Jul. 6, 2021

(54) CONTROLLER FOR A SWITCHED MODE POWER SUPPLY

(71) Applicant: NXP B.V., Eindhoven (NL)

(72) Inventor: Jeroen Kleinpenning, Malden (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/725,141

(22) Filed: Dec. 23, 2019

(65) Prior Publication Data
US 2020/0212814 A1     Jul. 2, 2020

(30) Foreign Application Priority Data
Dec. 27, 2018  (EP) ................................. 18248093

(51) Int. Cl.
| H02M 3/335 | (2006.01) |
| H02M 1/32 | (2007.01) |
| H02H 3/08 | (2006.01) |

(52) U.S. Cl.
CPC ......... *H02M 3/33569* (2013.01); *H02M 1/32* (2013.01); *H02H 3/08* (2013.01); *H02M 2001/327* (2013.01)

(58) Field of Classification Search
CPC ............... H02M 1/32; H02M 3/33569; H02M 3/33523; H02M 2001/327; H02M 2001/0058; H02H 3/08; H02H 3/20
See application file for complete search history.

(56) References Cited

U.S. PATENT DOCUMENTS

| 5,600,550 A | * | 2/1997 | Cook, II | ............. H02H 7/1257 363/15 |
| 5,699,239 A | * | 12/1997 | Komori | ............. G03G 15/2003 363/132 |
| 8,520,415 B1 | * | 8/2013 | Krishnamoorthy | ......................... H02M 3/33523 363/21.15 |
| 9,793,815 B2 | * | 10/2017 | Yu | ........................... G06F 1/266 |
| 9,991,809 B2 |  | 6/2018 | Kikuchi et al. |  |
| 2007/0018586 A1 | * | 1/2007 | Yagi | ...................... H05B 45/14 315/79 |

(Continued)

FOREIGN PATENT DOCUMENTS

JP        3013597 B2     2/2000

*Primary Examiner* — Yusef A Ahmed

(57) ABSTRACT

A controller for a secondary side of a switched mode power supply. A thermistor and an LED of an optocoupler are connected in parallel with each other between a voltage-supply-pin and a STOP pin of the controller. A reference-source provides a reference-signal between the STOP pin and the voltage-supply-pin. The STOP pin receives a temperature-measurement-signal from the thermistor, wherein the temperature-measurement-signal is representative of the resistance of the thermistor. The controller also includes an OTP-comparator that compares: (i) the temperature-measurement-signal; with (ii) a threshold-level, and provides an OTP-signal that is representative of whether or not the temperature-measurement-signal at the STOP pin crosses the threshold-level; and a switchable-current-source that selectively provides a bias-current to the STOP pin based on the OTP-signal, wherein the bias-current causes the LED to emit a light-signal that is representative of a fault to an associated photo-detector.

15 Claims, 10 Drawing Sheets

(56) References Cited

U.S. PATENT DOCUMENTS

| | | | |
|---|---|---|---|
| 2009/0129415 A1* | 5/2009 | Li | H01S 5/06804 372/38.01 |
| 2011/0068699 A1* | 3/2011 | Knapp | H04L 12/43 315/158 |
| 2013/0107585 A1* | 5/2013 | Sims | H02M 3/33592 363/21.14 |
| 2014/0240873 A1* | 8/2014 | Saka | H02H 7/1255 361/18 |
| 2015/0131335 A1* | 5/2015 | Miyamoto | H02M 3/33507 363/21.01 |
| 2015/0326008 A1* | 11/2015 | Baurle | H02H 1/0007 361/87 |
| 2015/0326129 A1* | 11/2015 | Lin | H02M 3/33507 363/21.12 |
| 2015/0381056 A1* | 12/2015 | Hayakawa | H02M 3/33507 363/21.15 |
| 2016/0036340 A1* | 2/2016 | Kikuchi | H02M 1/32 363/21.14 |
| 2016/0049865 A1* | 2/2016 | Ho | H02M 3/33507 363/21.12 |
| 2016/0072399 A1* | 3/2016 | Kikuchi | H02M 3/33523 363/21.14 |
| 2016/0249428 A1* | 8/2016 | Bandel | H05B 45/10 |
| 2016/0261202 A1* | 9/2016 | Kikuchi | H02M 3/33523 |
| 2016/0360582 A1* | 12/2016 | Kato | H05B 45/37 |
| 2017/0019092 A1* | 1/2017 | Taoka | H03K 17/082 |
| 2017/0302187 A1* | 10/2017 | Asao | H02M 3/33523 |
| 2017/0365994 A1* | 12/2017 | Kikuchi | H02H 7/1213 |
| 2017/0373603 A1* | 12/2017 | Basso | H02H 7/12 |
| 2018/0113404 A1* | 4/2018 | Yasukawa | G03G 15/205 |
| 2018/0175738 A1* | 6/2018 | Kikuchi | H02M 7/21 |
| 2018/0278164 A1 | 9/2018 | Mack et al. | |
| 2019/0215927 A1* | 7/2019 | Sooch | H05B 45/20 |

\* cited by examiner

US 11,056,978 B2

CONTROLLER FOR A SWITCHED MODE POWER SUPPLY

CROSS-REFERENCE TO RELATED APPLICATIONS

This application claims the priority under 35 U.S.C. § 119 of European patent application no. 18248093.9, filed Dec. 27, 2018 the contents of which are incorporated by reference herein.

FIELD

The present disclosure relates to a controller for a secondary side of a switched mode power supply, and in particular a controller that can use a single pin to detect a fault, and also to transmit a fault to a primary side of the switched mode power supply.

SUMMARY

According to a first aspect of the present disclosure there is provided a controller for a secondary side of a switched mode power supply, wherein the controller comprises:
- a STOP pin, for connecting to both: (i) a thermistor, and (ii) an LED of an optocoupler;
- a voltage-supply-pin, which is also for connecting to both: (i) the thermistor, and (ii) the LED of the optocoupler, such that the thermistor and the LED of the optocoupler are connected in parallel with each other between the voltage-supply-pin and the STOP pin;
- a reference-source, configured to provide a reference-signal between the STOP pin and the voltage-supply-pin, wherein the STOP pin is configured to receive a temperature-measurement-signal from the thermistor due to the reference-signal that is applied to it by the reference-source, wherein the temperature-measurement-signal is representative of the resistance of the thermistor;
- an OTP-comparator configured to compare: (I) the temperature-measurement-signal received at the STOP pin; with (ii) a threshold-level, and provide an OTP-signal that is representative of whether or not the temperature-measurement-signal at the STOP pin crosses the threshold-level; and
- a switchable-current-source configured to selectively provide a bias-current to the STOP pin based on the OTP-signal, wherein the bias-current is configured to cause the LED to emit a light-signal that is representative of a fault to an associated photo-detector.

Advantageously, the STOP pin provides a single pin solution for both (i) temperature sensing, and (ii) fault signal transmission.

It will be appreciated that 'STOP' is merely used as a name for the pin of the secondary controller that provides the functionality as described herein the term 'STOP' in itself does imply any limitation on the pin.

In one or more embodiments the reference-source comprises a reference-voltage-source that is configured to provide a reference voltage between the STOP pin and the voltage-supply-pin. The temperature-measurement-signal may be a current from the thermistor due to the reference voltage that is applied across it by the reference-voltage-source. The OTP-comparator may comprise a current-comparator that is configured to compare: (i) the current received at the STOP pin; with (ii) a threshold-current-level, and provide the OTP-signal that is representative of whether or not the current at the STOP pin crosses the threshold-current-level.

In one or more embodiments the reference voltage is less than the switch-on voltage of the LED.

In one or more embodiments the controller further comprises:
- a latch having a set pin and an output pin, wherein:
  - the set pin is configured to receive the OTP-signal; and
  - the output pin is connected to the switchable-current-source such that the switchable-current-source provides the bias-current to the STOP pin when the signal at the output pin of the latch is set.

In one or more embodiments the latch may further comprise a reset pin. The secondary controller may further comprise an under-voltage lockout component that is configured to:
- monitor the voltage at the voltage-supply-pin, and
- provide a signal to the reset pin of the latch when the voltage at the voltage-supply-pin drops below an under-voltage-threshold level.

In one or more embodiments the secondary controller is configured to receive: (i) an over-current-protection, OCP, signal that is representative of an over-current condition, and/or (ii) an over-voltage-protection, OVP, signal that is representative of an over-voltage condition. The secondary controller may further comprise a logic block that is configured to control the switchable-current-source such that it selectively provides one or more bias-currents to the STOP pin based on the OTP-signal; and one or both of the over-current-protection, OCP, signal, and (ii) the over-voltage-protection, OVP, signal.

In one or more embodiments the logic block comprises an OR gate having:
- a plurality of input terminals and an output terminal, wherein the plurality of input terminals are configured to receive: (i) the OTP-signal; and (ii) one or both of the over-current-protection, OCP, signal; and the over-voltage-protection, OVP, signal. The switchable-current-source may be configured to selectively provide the bias-current to the STOP pin based on the signal at the output terminal of the OR gate.

In one or more embodiments the switchable-current-source comprises a first-switchable-current-source that is configured to selectively provide a first-bias-current to the STOP pin based on:
- (a) the OTP-signal, and
- (b) one of: (i) an over-current-protection, OCP, signal that is representative of an over-current condition, and (ii) an over-voltage-protection, OVP, signal that is to representative of an over-voltage condition.

In one or more embodiments the controller further comprises: a second-switchable-current-source that is configured to selectively provide a second-bias-current to the STOP pin based on the other one of (i) the over-current-protection, OCP, signal, and (ii) the over-voltage-protection, OVP, signal.

In one or more embodiments the first-bias-current and the second-bias-current are modulated in different ways such that the light signal that is emitted by the LED is also modulated in different ways.

In one or more embodiments the first-bias-current has a first-amplitude that is configured to cause the LED to emit a first-light-signal having a first intensity. The second-bias-current may have a second-amplitude that is configured to cause the LED to emit a second-light-signal having a second intensity. The first-amplitude may be different to the second-amplitude.

In one or more embodiments the first-bias-current and the second-bias-currents are modulated with different time-varying profiles.

In one or more embodiments the switchable-current-source comprises a single switchable-current-source that is configured to selectively provide one of a plurality of modulated bias-current signals to the STOP pin based on one or more of:
the OTP-signal;
an over-current-protection, OCP, signal that is representative of an over-current condition; and
an over-voltage-protection, OVP, signal that is representative of an over-voltage condition.

In one or more embodiments the switchable-current-source is configured to:
selectively provide a first-bias-current to the STOP pin based on the OTP-signal, and one of: (i) the over-current-protection, OCP, signal, and (ii) the over-voltage-protection, OVP, signal; and
selectively provide a second-bias-current to the STOP pin based on the other one of (i) the over-current-protection, OCP, signal, and (ii) the over-voltage-protection, OVP, signal. The first-bias-current and the second-bias-current may be modulated with different time-varying profiles.

There is also provided a switched mode power supply comprising any secondary controller disclosed herein, and further comprising:
a primary side;
a secondary side;
a transformer that provides galvanic isolation between the primary side and the secondary side, wherein the transformer comprises a primary winding and a secondary winding;
a thermistor connected between the voltage-supply-pin and the STOP pin of the secondary controller;
an LED of an optocoupler, connected between the voltage-supply-pin and the STOP pin of the secondary controller;
a photo-detector on the primary side of the switched mode power supply, wherein the photo-detector is configured to receive the light-signal that is emitted by the LED on the secondary side of the SMPS;
one or more power switches on the primary side of the switched mode power supply; and
a primary controller that is configured to:
provide control signals for the one or more power switches to control the power that is put into the primary winding of the transformer; and
perform one or a plurality of different remedial-processes in response to the photo-detector receiving a light-signal from the LED.

In one or more embodiments the switched mode power supply further comprises:
a supervisor circuit, wherein:
the supervisor circuit is configured to monitor any property or parameter of the SMPS, or any component associated with the SMPS, in order to detect any appropriate type of fault, and
an open drain output terminal of supervisor circuit is connected to the STOP pin of the secondary controller.

The open drain output terminal of the supervisor circuit may be configured to pull the STOP pin down when a fault condition is detected by the supervisor circuit, such that the secondary controller is configured to provide a bias-current to the LED such that it causes the LED to emit a light-signal that is representative of a fault to an associated photo-detector.

There may be provided a method of operating a controller for a secondary side of a switched mode power supply, wherein the method comprises:
providing a reference voltage between a STOP pin and a voltage-supply-pin of the controller;
receiving a current at the STOP pin, wherein the current is from a thermistor that is connected between the STOP pin and the voltage-supply-pin of the controller due to the reference voltage that is applied across it;
comparing: (i) the current received at the STOP pin; with (ii) a threshold-current-level;
generating an OTP-signal that is representative of whether or not the current at the STOP pin crosses the threshold-current-level; and
selectively providing a bias-current to the STOP pin based on the OTP-signal, wherein the bias-current is configured to cause the LED to emit a light-signal that is representative of a fault to an associated photo-detector.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Switched mode power supply converters (SMPS) are used in chargers, adapters and power supplies. Some SMPSs are known to have galvanic isolation between a primary side and a secondary side of the converter. Examples of SMPSs that have such galvanic isolation include resonant converters and flyback converters. Safety is always very important for SMPSs.

Figure 1:
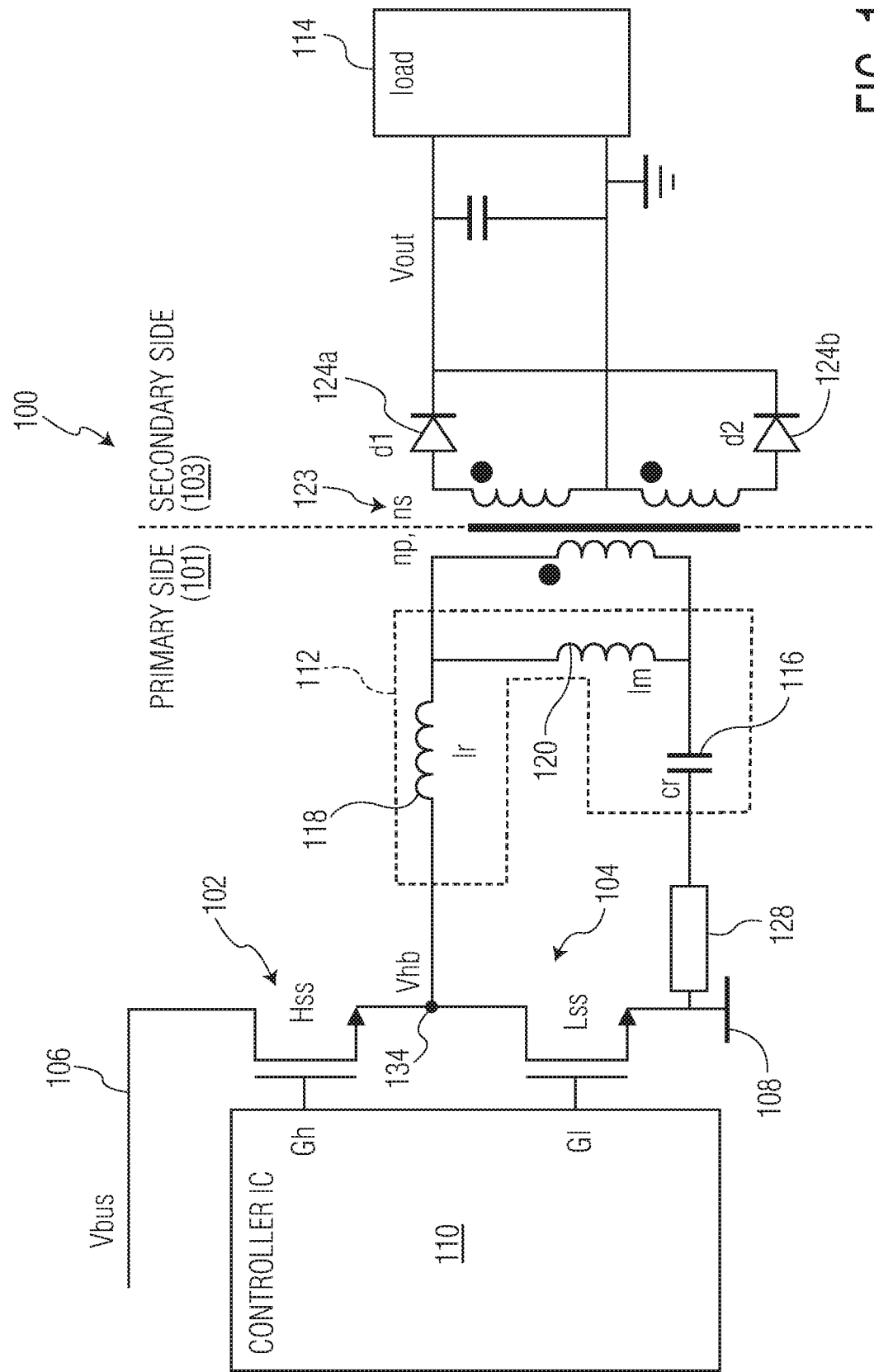
FIG. 1 shows an example of an LLC resonant converter, which is a type of SMPS.

FIG. 1 shows an example of an LLC resonant converter 100, which is a type of SMPS.

The LLC resonant converter 100 has a half bridge structure, which comprises a high-side-switch Hss 102 and a low-side-switch Lss 104 connected in series with each other between a voltage-bus-source $V_{bus}$ 106 and the ground terminal 108 as reference. A node between the series connection of the high-side-switch Hss 102 and the low-side-switch Lss 104 will be referred to as a half-bridge-node 134, which has a half-bridge-voltage Vhb.

The LLC resonant converter 100 also includes a transformer 123 having a primary winding and a tapped secondary winding. The primary winding, and the components galvanically connected directly to it, are on the primary side 101 of the resonant converter 100. The to tapped secondary winding, and the components galvanically connected directly to it, are on the secondary side 103 of the resonant converter 100. The tapped secondary winding is connected to two rectifier diodes 124a, 124b and a filter capacitor 126, which in turn are connected to a load 114.

The LLC resonant converter 100 has a resonant tank 112, which includes a resonant-capacitor Cr 116, a resonant-inductor Lr 118, and a magnetizing-inductor Lm 120. The resonant-capacitor Cr 116, the resonant-inductor Lr 118, and the magnetizing-inductor Lm 120 are connected in series between half-bridge-node 134 and a first terminal of a sense-resistor 128. A second terminal of the sense-resistor 128 is connected to ground 108.

In the example of FIG. 1, the resonant-capacitor Cr 116 and the resonant-inductor Lr 118 are connected in series between the half-bridge-node 134 and a first terminal of the primary winding of the transformer 123. The magnetizing-inductor Lm 120 is connected in parallel with the primary winding. A second terminal of the primary winding is connected to a first terminal of the sense-resistor 128.

The LLC resonant converter 100 has a primary controller 110 that provides control-output-signals to the high-side-switch Hss 102 and the low-side-switch Lss 104 in order to control when energy is put into the resonant tank 112 from the voltage-bus-source Vbus 106, and when energy is taken out of the resonant tank 112. The load 114 can receive the energy during both the phases: when the high-side-switch conducts and when the low-side-switch conducts.

The primary controller 110 can determine the control-output-signals for the high-side-switch Hss 102 and the low-side-switch Lss 104, in order to control the switching of the LLC resonant converter 100, the based on one or more state variables of the LLC resonant converter 100. For instance: the control-output-signals can be based on the level of a primary current flowing through the resonant converter 100, and/or a primary-voltage-signal that is representative of a voltage across the primary winding of the transformer 123.

In some examples, the two rectifier diodes 124a, 124b at the secondary side 103 of the resonant converter 100 can be implemented as synchronous rectifiers, the operation of which is controlled by a secondary controller (not shown).

A fault condition like an over-temperature, an over-current, an over-voltage or an over-power should be detected for keeping operation of the resonant convert 100 safe. The detection of an over-temperature can be done by placing an NTC thermistor (negative temperature coefficient thermal resistor) close to a potential failure location, such as the transformer or a connector to the load. The detection of an over-current can be performed by a sense resistor in a current path at the secondary side 103. The detection of an over-voltage can be performed by monitoring the output voltage level at the secondary side 103.

The detection of a fault condition can be used to shut down the power delivery and consequently end the over-temperature, the over-voltage or the over-current condition. Then, the SMPS can return to a safe state.

The source of the power supply is at the primary side 101 of the resonant converter 100. In some examples, the detection of a fault condition can be performed at the secondary side 103. Therefore, the detected fault condition should be communicated to the primary side 101 for controlling the high-side-switch Hss 102 and the low-side-switch Lss 104 in order to turn off the power delivery. In this way, a fault-signal can cross the mains-isolation. One way of providing such a fault signal is to use an optocoupler (not shown). The optocoupler can include an LED at the secondary side 103, and a photo-detector at the primary side 101 of the resonant converter 100. The LED is used to transmit a light signal to the photo-detector. A secondary controller (not shown) can be used to control the LED to transmit the light signal when a fault is detected at the secondary side 103.

Figure 2:
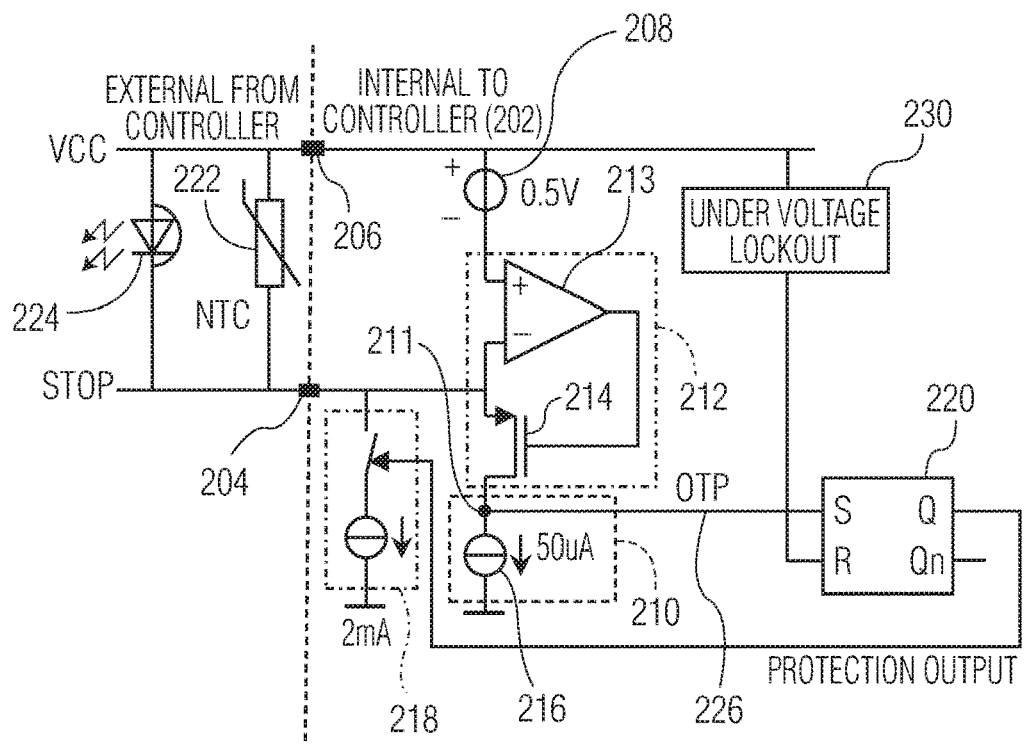
FIG. 2 shows an example embodiment of a secondary side controller that can be used with a SMPS such as the one of FIG. 1.

FIG. 2 shows an example embodiment of a secondary side controller 202 that can be used with a SMPS such as the one of FIG. 1.

The secondary controller 202 has a pin that will be referred to in this document as a STOP (Sensing of Temperature and Output of Protection) pin 204. It will be appreciated that 'STOP' is merely used as a name for the pin of the secondary controller 202, and that the term 'STOP' in itself does imply any limitation on the pin. The controller 202 also has a voltage-supply-pin 206, which is configured to receive a supply voltage Vcc. In some examples, the supply voltage Vcc for the secondary controller 202 can be the output voltage of the SMPS.

As shown in FIG. 2, a thermistor 222 is connected between the STOP pin 204 and the voltage-supply pin 206. In this example the thermistor 222 is a NTC thermistor (negative temperature coefficient thermal resistor). As discussed above, this thermistor 222 can be placed at any position that is close to a component that is susceptible to over-heating. Also connected between the STOP pin 204 and the voltage-supply pin 206 is the LED 224 of an optocoupler. In this way, the thermistor 222 and the LED 224 of the optocoupler are connected in parallel with each other between the voltage-supply-pin 206 and the STOP pin 204.

The optocoupler also includes a photo-detector (not shown) on the primary side of the SMPS. As will be explained in detail below, the LED 224 is used to transmit a light signal to the photo-detector that is representative of a fault that is detected at the secondary side. The fault can relate to one or more of: (I) over-temperature protection (OTP), which in some examples can be considered as related to over-power protection, (ii) over-current protection (OCP), and (iii) over-voltage protection (OVP). When the primary side controller determines that the fault signal has been received, it can shut down the power conversion of the SMPS as a safety precaution.

Advantageously, the STOP pin 204 provides a single pin solution for both (i) temperature sensing, and (ii) fault signal transmission. During normal operation (for example when an over-temperature has not been detected), the STOP pin 204 can receive and process a signal that is representative of the temperature of the NTC thermistor 222. During a fault condition, the same STOP pin 204 can cause a fault/protection signal to the transmitted to the primary side of the SMPS by the LED 224 of the optocoupler. It can be beneficial to keep the number of pins that is required by the secondary controller to as small a number as possible. This can reduce the area on the PCB (printed circuit board) and the package of the secondary controller, and therefore can result in lower cost and an improved power density. Furthermore, since the power density can be increased, this can result in an increased likelihood of hotspots where the temperature can reach unacceptably high levels. In which case fault protection is even more important.

The controller 202 includes a reference-voltage-source 208, which together with an amplifier 212 in this example, is configured to provide a reference voltage between the STOP pin 204 and the voltage-supply-pin 206. The reference-voltage-source 208 is an example of a reference-source; and the reference voltage is an example of a reference-signal. The reference-voltage-source 208 has a positive-terminal, which is connected to the voltage-supply-pin 206. The amplifier 212 includes an operational-amplifier 213. The operational-amplifier 213 has an op-amp-positive-terminal, which is connected to a negative-terminal of the voltage-supply-pin 206. The operational-amplifier 213 has an op-amp-negative-terminal, which is connected to the STOP pin 204. The amplifier 212 also includes a p-type MOSFET 214 in this example. The source of the p-type MOSFET 214 is connected to the op-amp-negative-terminal, and therefore is also connected to the STOP pin 204. The gate of the p-type MOSFET 214 is connected to an op-amp-output-terminal. The drain of the p-type MOSFET 214 is connected to a current-comparison-node 211.

The voltage-level of the reference-voltage-source 208 is 0.5V in this example. In this way, a constant reference voltage of 0.5V is forced over the NTC thermistor 222 and also the LED 224 of the optocoupler. The voltage level of the reference-voltage-source 208 can be set such that it is less than a switch-on voltage of the optocoupler. That is, the voltage-level of the reference-voltage-source 208 can be less than the switch-on/forward voltage of the LED 224. In this way the reference-voltage-source 208, by itself, does not provide sufficient voltage across the LED 224 for it to transmit light to its associated photodetector.

However, the reference-voltage-source 208 does provide a sufficient voltage drop across the NTC thermistor 222 such that the secondary controller 202 can effectively compare the resistance of the NTC thermistor 222 with a threshold. Therefore, the secondary controller 202 can determine whether or not a temperature of the NTC thermistor 222 has exceeded a threshold.

An example NTC thermistor 222 is a 100 kOhm thermistor. At 25° C., with the 0.5V reference voltage dropped across it, the current through the NTC thermistor 222 and into the STOP pin 204 is 5 uA. In this way, the STOP pin 204 receives a current from the thermistor 222 due to the reference voltage that is applied across it by the reference-voltage-source 208.

The controller 202 also includes a current-comparator 210. The current-comparator 210 in this example includes a threshold-current-source 216 and the current-comparison-node 211. The threshold-current-source 216 is connected between: (i) the current-comparison-node 211, and (ii) a reference terminal, which in this example is ground. The threshold-current-source 216 provides a threshold-current having a threshold-current-level. In other examples, the threshold-current can be received from an external component.

The current-comparator 210 is configured to compare: (i) the current at the STOP pin 204 (as received from the STOP pin 204 through the p-type MOSFET 214); with (ii) the threshold-current-level (as provided by the threshold-current-source 216). The threshold-current-source 216 can provide the threshold-current to the current-comparison-node 211 such that it has the opposite polarity to the current received at the current-comparison-node 211 from the STOP pin 204. The current-comparator 210 provides an OTP-signal at the current-comparison-node 211 that is representative of whether or not the current at the STOP pin 204 is greater than the threshold-current-level. The current-comparison-node 211 is low when the 50 uA provided by the threshold-current-source 216 is larger than 0.5V/Rntc, and the current-comparison-node 211 is high when 50 uA is lower than 0.5V/Rntc. Where Rntc is the resistance of the NTC thermistor 222. The OTP-signal can also be referred to as a current-comparison-signal (OTP).

The current-comparator 210 is an example of an OTP-comparator that is configured to compare: (i) a temperature-measurement-signal (in FIG. 2 a current signal) received at the STOP pin 204; with (ii) a threshold-level (in FIG. 2 the threshold-current-level), and provide an OTP-signal 226 that is representative of whether or not the temperature-measurement-signal at the STOP pin 204 crosses the threshold-level. The temperature-measurement-signal is representative of the resistance of the NTC thermistor 222. It is recalled that the resistance of the NTC thermistor 222 carries the temperature information. In FIG. 2, the controller 202 applies a voltage across the NTC thermistor 222 and determines whether or not the temperature is too high based on the current that flows through the NTC thermistor 222.

In other examples, a reference-current-source can be used as the reference-source instead of the reference-voltage-source 208 of FIG. 2, and a voltage-comparator can be used as the OTP-comparator instead of the current-comparator 210 of FIG. 2. In this way, the voltage-comparator can compare: (i) a voltage signal (as an example of a temperature-measurement-signal) at the STOP pin 204; with (ii) a threshold-voltage-level (as an example of a threshold-level), and provide an OTP-signal 226 that is representative of whether or not the voltage signal at the STOP pin 204 crosses the threshold-voltage-level. Due to the relationship between resistance and voltage of the NTC thermistor 222, in this example the OTP-signal 226 is representative of whether or not the voltage signal at the STOP pin 204 is lower than the threshold-voltage-level. It will be appreciated that this is another way of comparing the resistance of the NTC thermistor 222 (and hence its temperature) with a threshold in order to determine if it is too hot.

Figure 3:
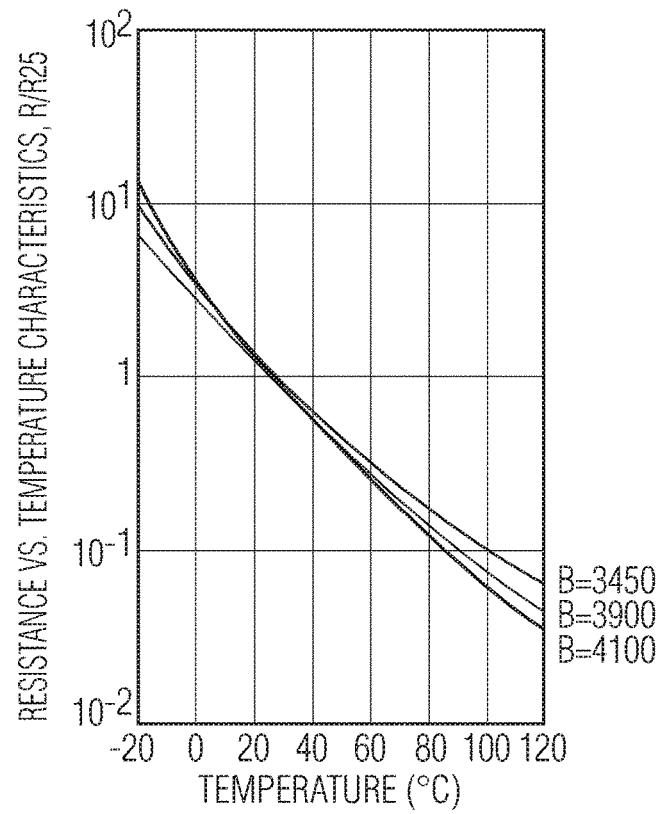
FIG. 3 shows an example plot of the resistance of an NTC thermistor versus temperature.

FIG. 3 shows an example plot of the resistance of an NTC thermistor (on the vertical axis) versus temperature (on the horizontal axis). As shown, resistance decreases as temperature increases.

For the NTC thermistor 222 of FIG. 2, as discussed above, the current through the NTC is 5 uA at 25° C. Therefore, the OTP-signal 226 is not triggered/set because the current at the STOP pin 204 (5 uA) is less than the threshold-current-level (50 uA). As the temperature of the NTC thermistor 222 increases, the resistance of the NTC thermistor 222 decreases. Therefore, the current through the NTC thermistor 222 due to the reference voltage of 5V increases, and the current into the STOP pin 204 also increases. If the temperature of the NTC thermistor 222 increases to 100° C., then the resistance of the NTC thermistor 222 drops to 10 kOhm. When the resistance of the NTC thermistor 222 is 10 kOhms, a current of 50 uA flows through it and therefore also flows into the STOP pin 204. Therefore, the OTP-signal 226 is triggered/set when the temperature of the NTC thermistor 222 rises above 100° C. because the current at the STOP pin 204 (greater than 50 uA) will be higher than the threshold-current-level (50 uA). This can be considered as a failure condition. In this way, the output of the current comparator 210 with a 50 uA threshold-current-level switches to a logical high-level and, as will be described below, triggers the OTP protection.

The threshold-current-level can be set such that the transition of the value of the OTP-signal 226 occurs at a desired temperature value of the NTC thermistor 222, as defined by its associated resistance at that temperature. Alternatively, the component value of the NTC thermistor 222 can be selected such that a predetermined threshold-current-level is exceeded when the NTC thermistor 222 reaches a desired temperature.

The controller 202 also includes a switchable-current-source 218 that can selectively provide a bias-current to the STOP pin 204 based on the state of the OTP-signal 226. This bias-current will cause the LED 224 to transmit a light signal to its associated photo-detector, which is indicative of a fault. In this example, the switchable-current-source 218 provides a bias-current to the STOP pin 204 when the OTP-signal 226 is representative of the current at the STOP pin 204 being greater than the threshold-current-level. This is because, in this example, the resistance of the NTC thermistor 222 decreases as the temperature increases. In other examples, if a PTC (positive temperature coefficient) thermistor is used, the switchable-current-source 218 can provide a bias-current to the STOP pin 204 when the current at the STOP pin 204 is less than the threshold-current-level.

In FIG. 2, the switchable-current-source 218 is shown as a current source and a switch (that we will refer to as a bias-switch) in series with each other. It will be appreciated that the switchable-current-source 218 can be implemented in different ways, while still providing the same functionality.

Figure 4:
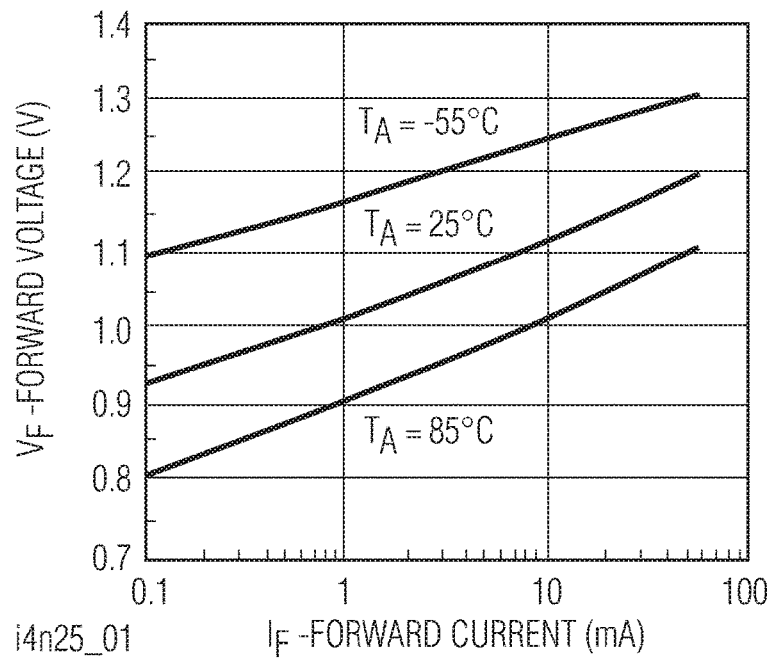
FIG. 4 shows how the forward voltage across an LED of an optocoupler varies with the forward current through the LED.

FIG. 4 shows how the forward voltage across an LED of an optocoupler (on the vertical axis) varies with the forward current through the LED (on the horizontal axis). As shown in the figure, no current flows when the voltage across the LED is less than a switch-on voltage, which depends on the temperature of the LED. The switch-on voltage has a value in the range of 0.8V to 1.1V when the temperature of the LED is between −55° C. and 85° C. In addition, as is known in the art, the LED has a clear relation between light and current, whereby the electrons of the current through the LED cause the photon emission.

Returning to FIG. 2, when the switchable-current-source 218 is providing a current to the STOP pin 204, a typical voltage-drop over the LED 224 with a 2 mA forward current is 1V. The majority of the 2 mA bias-current provided by the switchable-current-source 218, perhaps 1.9 mA, will flow through the LED 224. Therefore, only about 100 uA will flow through the NTC thermistor 222. In this way, the bias-current is configured to cause an opto-coupler that is connected to the STOP pin 204 to transmit a signal that is representative of a fault to an associated photo-detector.

In this example, the controller 202 also includes a latch 220 having a set pin (S), a reset pin (R) and an output pin (Q). The latch can optionally be provided as part of a logic block. The set pin (S) receives the OTP-signal 226. The output pin (Q) is connected to the switchable-current-source 218 such that the switchable-current-source 218 provides the bias-current to the STOP pin 204 when the signal at the output pin (Q) of the latch 220 is set/high. The switchable-current-source 218 does not provide the bias-current to the STOP pin 204 when the signal at the output pin (Q) of the latch 220 is unset/low.

In this way, the OTP-signal 226 sets the latch 220 such that it stores the OTP event, and turns on the switchable-current-source 218 such that it provides a bias-current to the STOP pin 204.

In this example, the secondary controller 202 also includes an under-voltage lockout component (UVLO) 230 that is used to reset the latch 220. The UVLO 230 monitors the voltage at the voltage-supply-pin 206 (which can be the output voltage of the SMPS), and provides a signal to the reset pin (R) of the latch 220 when the voltage at the voltage-supply-pin 206 drops below an under-voltage-threshold level. Once the latch 220 is reset, the signal at the output pin (Q) of the latch 220 goes low and the switchable-current-source 218 is controlled such that it no longer provides the bias-current to the STOP pin 204. In this way, once the power supply is stopped at the primary side, the output voltage at the secondary side will drop and the protection latch 220 can be reset automatically when the output voltage reaches the under-voltage-threshold level. This operation can repeat with an auto-restart until the failure condition is removed.

Beneficially, the secondary controller 202 of FIG. 2 can monitor the temperature of a NTC thermistor 222 during normal operation using the STOP pin 204, without driving the LED 224 of an optocoupler. Also, the STOP pin 204 can be used to communicate when a fault condition occurs after an over-temperature threshold is triggered. The temperature information may not be needed by the secondary controller once the over-temperature threshold has been exceeded, and therefore the NTC thermistor 222 and the LED 224 of the optocoupler can be connected to the same pin.

In the example of FIG. 2, the NTC thermistor 222 and the LED 224 (which may be referred to as an opto-coupler input) are placed high side and connected to the output voltage of the supply (the voltage-supply-pin 206 of the secondary controller 202). Having this high side connection can be beneficial for a connection with an additional control for driving the common LED 224.

As will be discussed below, advantageously an open drain output of an additional supervisor IC can also be connected to the same STOP pin 204, even when these circuits do not share the same supply voltage. For example, a 12V supply voltage for the secondary control with STOP pin 204, and a 5V supply voltage for the additional supervisor IC. The additional supervisor can have an open-drain output that in case of a triggered protection can pull down the STOP pin 204.

Therefore, one single pin can used for up to 3 functions:
1) temperature sensing with an external thermistor,
2) driving of an opto-coupler with a protection signal for communication to the primary side, and
3) connection of an extra supervisor IC.

Such an arrangement can be superior to a topology that has a dedicated pin for temperature sensing, and a dedicated pin for driving the optocoupler. This is because fewer pins are required and therefore the circuit can occupy a reduced amount of space.

Figure 5:
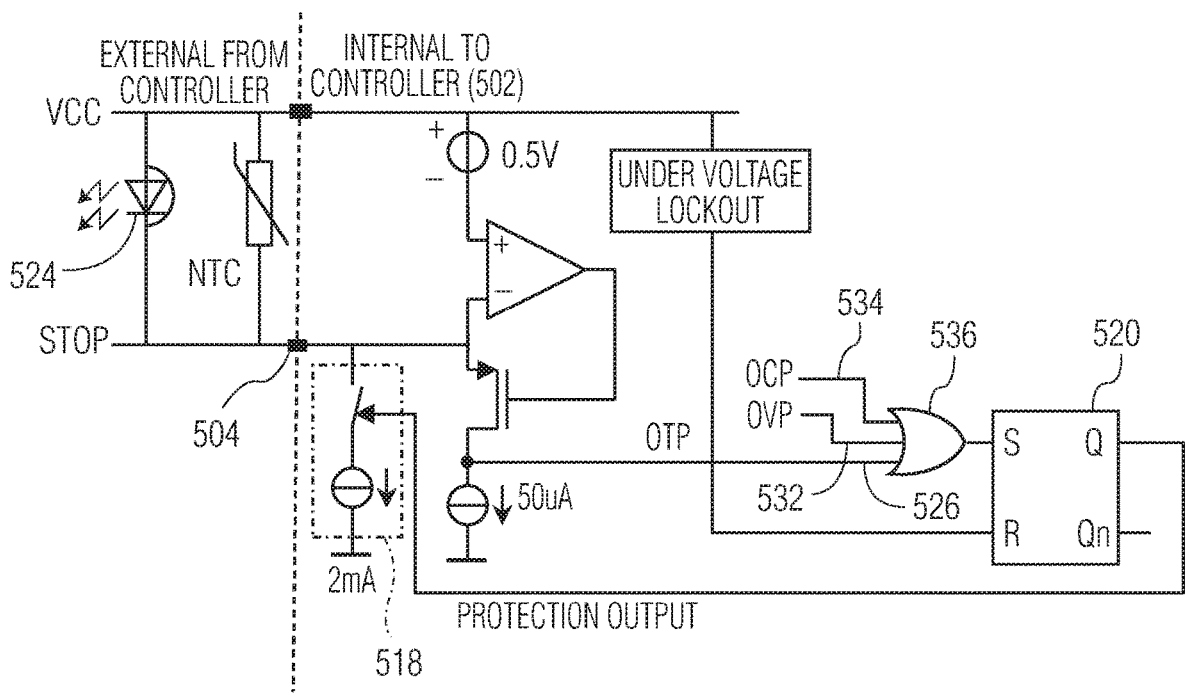
FIG. 5 shows another example embodiment of a secondary controller, which is similar to the embodiment of FIG. 2.

FIG. 5 shows another embodiment of a secondary controller 502, which is similar to the embodiment of FIG. 2. Corresponding features have been given corresponding reference numbers in the 500 series in FIG. 5.

In addition to the components of FIG. 2, the secondary controller 502 of FIG. 5 also includes an OR gate 536. One of the input terminals of the OR gate 536 receives the OTP-signal 526, which is representative of an over-temperature condition. The output terminal of the OR gate 536 is connected to the set pin of the latch 520. In this way, the switchable-current-source 518 can be activated in the same way as in FIG. 2.

The OR gate 536 can also have one or two input terminals that are configured to receive (i) an over-current-protection (OCP) signal 534 that is representative of an over-current condition, and/or (ii) an over-voltage-protection (OVP) signal 532 that is representative of an over-voltage condition. In this way, the STOP pin 504 can be used to activate the LED to transmit a failure signal to the primary side in response to any one of: an over-temperature condition, an over-current condition and an over-voltage condition. The OCP-signal 534 and the OVP-signal 532 can be provided in any way that is known in the art.

Figure 6:
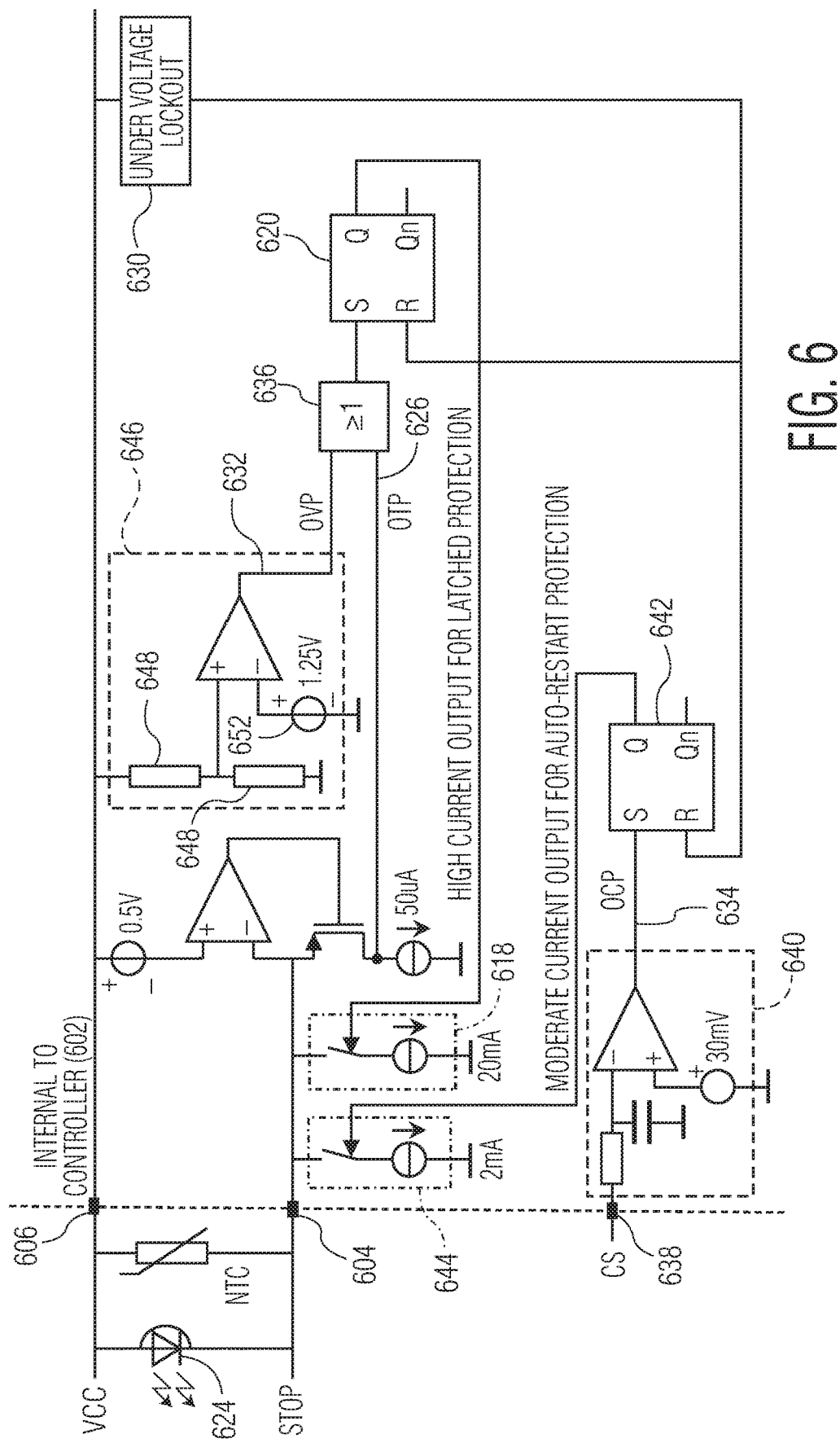
FIG. 6 shows another example embodiment of a secondary controller.

FIG. 6 shows another embodiment of a secondary controller 602. Features of FIG. 6 that are also shown in FIG. 2 or FIG. 5 have been given corresponding reference numbers in the 600 series.

In FIG. 6, the secondary controller 602 can provide an OTP-signal 626 in the same way as for FIGS. 2 and 5. In this example, the OTP-signal 626 is provided to an input of an OR gate 636.

The secondary controller 602 also includes an over-voltage protection (OVP) module 646, which provides an OVP-signal 632 to another input of the OR gate 636. As above, the OVP-signal 632 is representative of an over-voltage condition. In this example, the OVP module 646 includes a resistive divider 648, an OVP-comparator 650, and an OVP-reference-voltage-source 652. The resistive divider 648 includes at least two resistors and is connected between the voltage-supply pin 606 and ground. A node between two of the resistors is connected to a positive-input-terminal of the OVP-comparator 650. In this way, a proportion of the voltage at the voltage-supply pin 606 is provided to one of the inputs of the OVP-comparator 650. The other input of the OVP-comparator 650 is connected to the OVP-reference-voltage-source 652. Therefore, the output of the OVP-comparator 650 is set when the proportion of the voltage at the voltage-supply pin 606 is higher than the level of the voltage provided by the OVP-reference-voltage-source 652. The output of the OVP-comparator 650 is the OVP-signal 632.

The output of the OR gate 636 is connected to the set pin of a first-latch 620. When the output pin (Q) of the first-latch is high, it controls a first-switchable-current-source 618 such that it selectively provides a first-bias-current to the STOP pin 604. The first-bias-current in this example is 20 mA. The first-bias-current will cause the LED 224 to transmit a first-light-signal to its associated photo-detector, which is indicative of a first-type of fault.

In this way, the first-switchable-current-source 618 can selectively provide a first-bias-current to the STOP pin 604 based on the state of the OTP-signal 626 and the OVP-signal 632.

The secondary controller 602 also includes an over-current protection (OCP) module 640, which provides an OCP-signal 634 when an over-current condition is detected. The OCP module 640 is connected to a CS (common-source) pin 638 of the secondary controller 602 such that it receives a current that is representative of the current flowing through the secondary side of the SMPS. (The CS pin 638 will be described in more detail with reference to FIG. 8.) In this example, the OCP module 640 includes a low-pass filter made up of a resistor and a capacitor, an OCP-comparator 652, and an OCP-reference-voltage-source 654. The low-pass filter can provide an average value of the current signal that flows into the CS pin 638, which may be sinusoidal. A first-input-terminal of the OCP-comparator 652 is connected to the low-pass filter such that it receives the averaged current signal. A second-input-terminal of the OCP-comparator 652 is connected to the OCP-reference-voltage-source 654. Therefore, the OCP-comparator 652 sets the output of the OCP-comparator 650 when the averaged current at the CS pin 638 is higher than a threshold-over-current, as defined by the level of the voltage provided by the OCP-reference-voltage-source 654. The output of the OCP-comparator 652 is the OCP-signal 634.

The output of the OCP module 640 is connected to the set pin (S) of a second-latch 642. When the output pin (Q) of the second-latch 642 is high, it controls a second-switchable-current-source 644 such that it selectively provides a second-bias-current to the STOP pin 604. The second-bias-current in this example is 2 mA. The second-bias-current will cause the LED 224 to transmit a second-light-signal to its associated photo-detector, which is indicative of a second-type of fault.

In this way, the second-switchable-current-source 644 can selectively provide a second-bias-current to the STOP pin 604 based on the state of the OCP-signal 634. It will be appreciated that in other examples, the OCP-signal 634 and the OVP-signal 632 can be swapped such that the OCP-signal 634 is provided as an input OR gate 636, and the OVP-signal 632 can be provided to the set pin (S) of the second latch (642).

The first-bias-current and the second-bias-current are modulated in different ways such that the light signal that is emitted by the LED 624 is also modulated in two different ways. In the example of FIG. 6, the light signal is modulated with two different intensities. The first-bias-current has a first-amplitude that causes the LED to emit a first-light-signal having a first intensity, and the second-bias-current has a second-amplitude that causes the LED to emit a second-light-signal having a second intensity. The first-amplitude is different to the second-amplitude, and therefore the first intensity is also different to the second intensity, the difference can be large enough to cover CTR variation of the LED (current transfer ratio; the ratio of the output current to the input current). Therefore, a controller on the primary side that processes the signal received by the corresponding photo-detector can perform one or a plurality of different remedial-processes in response to receiving a photo-detector at the primary side of the SMPS receiving a light-signal from the LED 724. Therefore, a remedial-process that is performed depends upon the bias-current that is provided to the LED 724 by the secondary controller 602. Examples of remedial-processes that can be performed at the primary side will be described in more detail below.

In this example, both the first-latch 620 and the second-latch 642 have a reset pin (R) that is connected to a UVLO 630 in the same way as FIG. 2. Therefore, both latches 620, 642 can be reset when the voltage at the voltage-supply-pin 606 drops below an under-voltage-threshold level.

Figure 7:
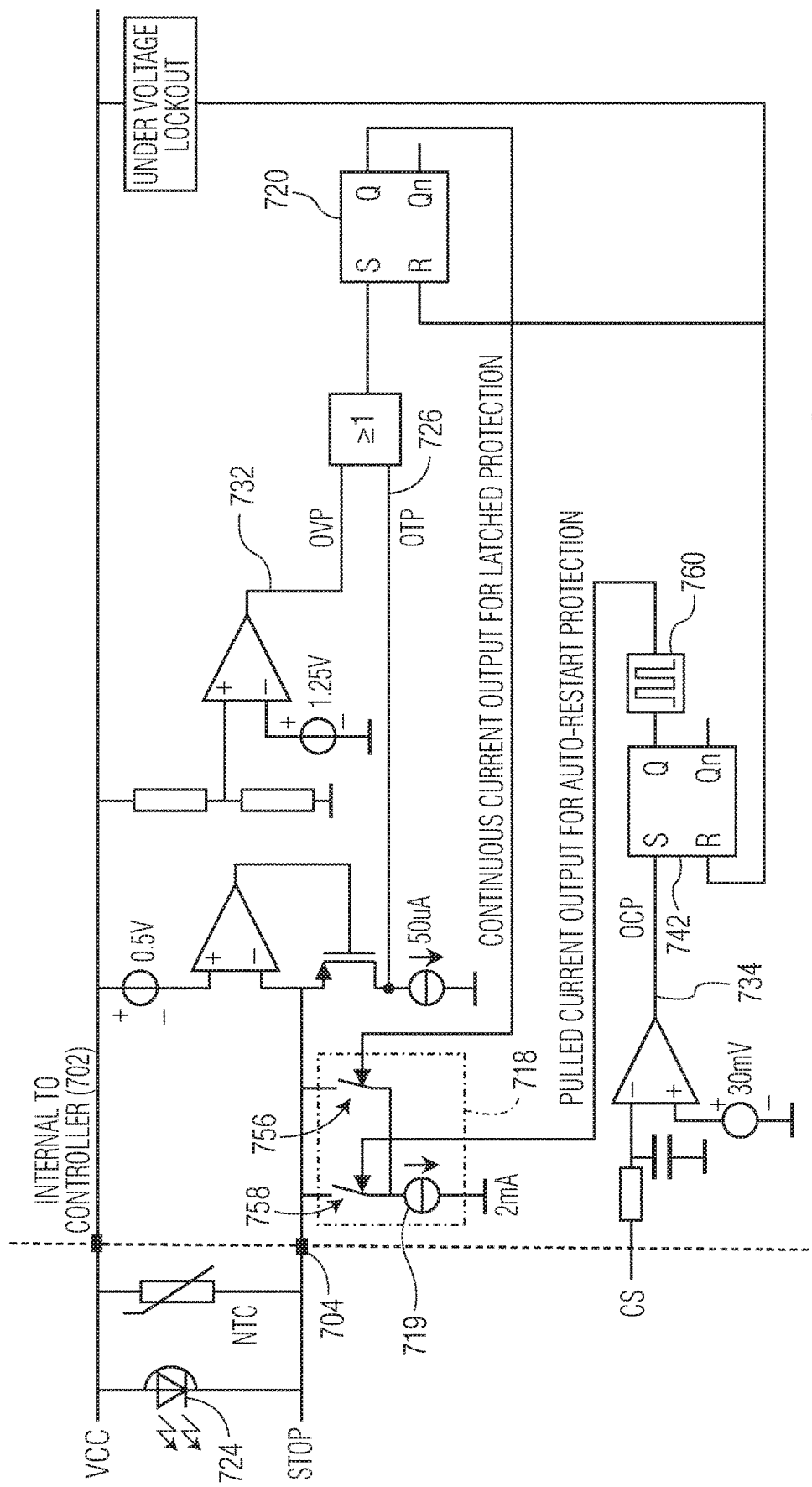
FIG. 7 shows another embodiment of a secondary controller that is similar to that of FIG. 6.

FIG. 7 shows another embodiment of a secondary controller 702 that is similar to that of FIG. 6. Features of FIG. 7 that have already been described with reference to an earlier figure will not necessarily be described again here. The secondary controller 702 of FIG. 7 modulates a first-bias current and a second-bias current in a different way to the secondary controller of FIG. 6. More particularly, one of the bias-currents can be modulated with a different time-varying profile to the other bias-current. In this example, one of the bias-currents is a pulsed current and the other bias-current is a continuous current. In other examples, one or both of the bias-currents can be modulated with pulse width modulation or pulse frequency modulation. If both bias-currents are modulated with the same type of modulation, then different modulation parameters can be used, such as different pulse widths or different frequencies.

In this example, the differently modulated bias-currents can be provided by a single switchable-current-source 718. The secondary controller 702 includes a current-source 719 (which can provide a current having a fixed current level), a first-bias-switch 756 and a second-bias-switch 758. Each of the first-bias-switch 756 and the second-bias-switch 758 are connected between the current-source 719 and the STOP pin 704. In this way, the bias-switches are in parallel with each other such that current is provided to the STOP pin 704 by the switchable-current-source 718 if either of the bias-switches is closed.

The secondary controller 702 includes a first-latch 720, which is the same as the first-latch of FIG. 6. The output pin (Q) of the first-latch 720 is connected to the first-bias-switch 756. When the output pin (Q) of the first-latch 720 is set high, it causes a first-bias current to be provided to the STOP pin 704. In this example, the first-bias current is a continuous current of 2 mA.

The secondary controller 702 also includes a second-latch 742, which is the same as the second-latch of FIG. 6. In this example however, the output pin (Q) of the second-latch 742 is connected to a pulse-generator 760. The output of the pulse-generator 760 selectively provides a time-varying signal to the second-bias-switch 758 based on the state of the signal at the output pin (Q) of the second-latch 742. In this way, the second-bias current in this example is a time-varying current with a high-level of 2 mA. For example the second-bias current can have a square wave profile, which varies between 2 mA and zero. It will be appreciated that any time-varying profiles that can be recognised by the primary side controller can be used.

In this way, a single switchable-current-source 718 can selectively provide one of a plurality of modulated bias-current signals to the STOP pin 704 based on the state of one or more of: the OTP-signal 726, the OVP-signal 732, and the OCP-signal 734.

It will be appreciated that in other examples, the functionality of the two bias-switches 756, 758 can be provided by a single bias-switch with appropriate connections to the first-latch 620 and the second-latch 742.

Figure 8:
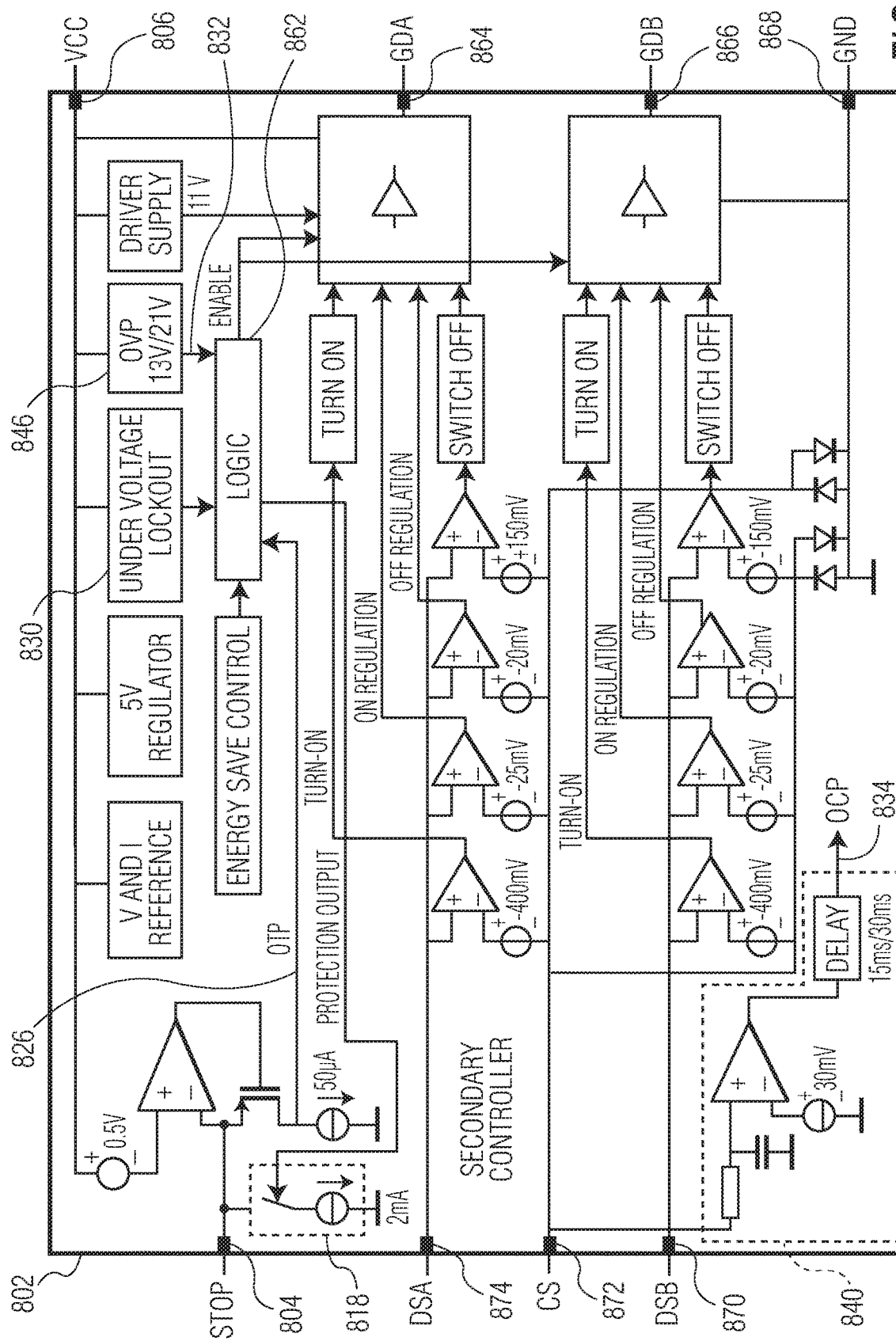
FIG. 8 shows an example embodiment of a secondary controller.

FIG. 8 shows an example embodiment of a secondary controller 802. The secondary controller 802 can control two field effect transistors (FETs) at the secondary side of the SMPS such that they operate as synchronous rectifiers. For example, the secondary controller 802 can control the FETs such that they perform the functionality of the two rectifier diodes of FIG. 1. Each FET has a drain, a source and a gate terminal. One of the FETs will be referred to as FET-A, and the other will be referred to as FET-B.

The secondary controller 802 has the following pins, for connecting to the FETs:

DSA 874—for sensing the voltage at the drain of FET-A;
DSB 870—for sensing the voltage at the drain of FET-B;
CS 872—for connecting to the source terminals of FET-A and FET-B. This pin can be referred to as a common source pin;
GDA 864—for driving the gate of FET-A;
GDB 866—for driving the gate of FET-B.

The secondary controller 802 has various processing modules that are connected to the FETs using the above pins in order to operate them as synchronous rectifiers. Such processing modules are known in the art and will not be described here.

The secondary controller 802 also includes a STOP pin 804, a reference/ground pin 868, and a voltage-supply-pin 806. The voltage-supply-pin 806 is configured to receive the output voltage of the SMPS as a supply voltage Vcc.

The controller 802 of FIG. 8 includes the same components that are shown in FIG. 2, in order to provide an OTP-signal 826. The OTP-signal 826 is a provided to a logic block 862.

The controller 802 also includes an OVP module 846 that provides an OVP-signal 832 to the logic block 862. The over-voltage is detected on the supply voltage of the IC on the VCC pin 806.

The controller 802 further includes an OCP-module 840 that provides an OCP-signal 834 to the logic block 862. (The link between the OCP-module 840 and the logic block 862 is not shown in FIG. 8 so as not to obstruct the clarity of the drawing.) The over-current is detected as a voltage drop over a sense resistor measured via the common source (CS) pin 872.

The logic block 862 can include one or more protection latches, as discussed above. One or more of the OTP trigger signal 826, the OVP trigger signal 832 and the OCP trigger signal 834 can set a protection latch via an OR-gate, or any other logic function. Such other logic function can be any logical combination of the trigger signals 826, 832, 834.

In this way, the logic block can perform any appropriate processing for controlling a switchable-current-source 818 such that it selectively provides one or more bias-currents to the STOP pin 804 based on the state of one or more of: (i) the OTP-signal 826; (ii) the OVP-signal 832; and (iii) the OCP-signal 834. The "protection output" signal from the logic block that is shown in FIG. 8 can turn on the 2 mA switchable-current-source 818 such that a fault signal is sent to the primary side by the optocoupler (not shown). It will be appreciated that the processing described above in terms of latching the state of various signals is merely exemplary, and that other logic functions can be used to suit a specific application.

In the same way as described above, the STOP pin 804 is used to both (i) sense temperature, and (ii) transmit a fault signal. The fault signal can be representative of the triggering of one or more of: over-temperature, over-voltage, and over-current protection. In this way, the secondary controller 802 of FIG. 8 can be considered as one example of how OTP, OVP & OCP protection can be integrated into a synchronous rectifier (SR) circuit at the secondary side of an SMPS. Furthermore, the total protection functionality of the integrated solution can be incorporated with only 1 additional pin assignment.

A UVLO module 830 can be used to reset one or more of the protection signals in the same way as described above, by providing an appropriate signal to the logic block 862.

Figure 9A:
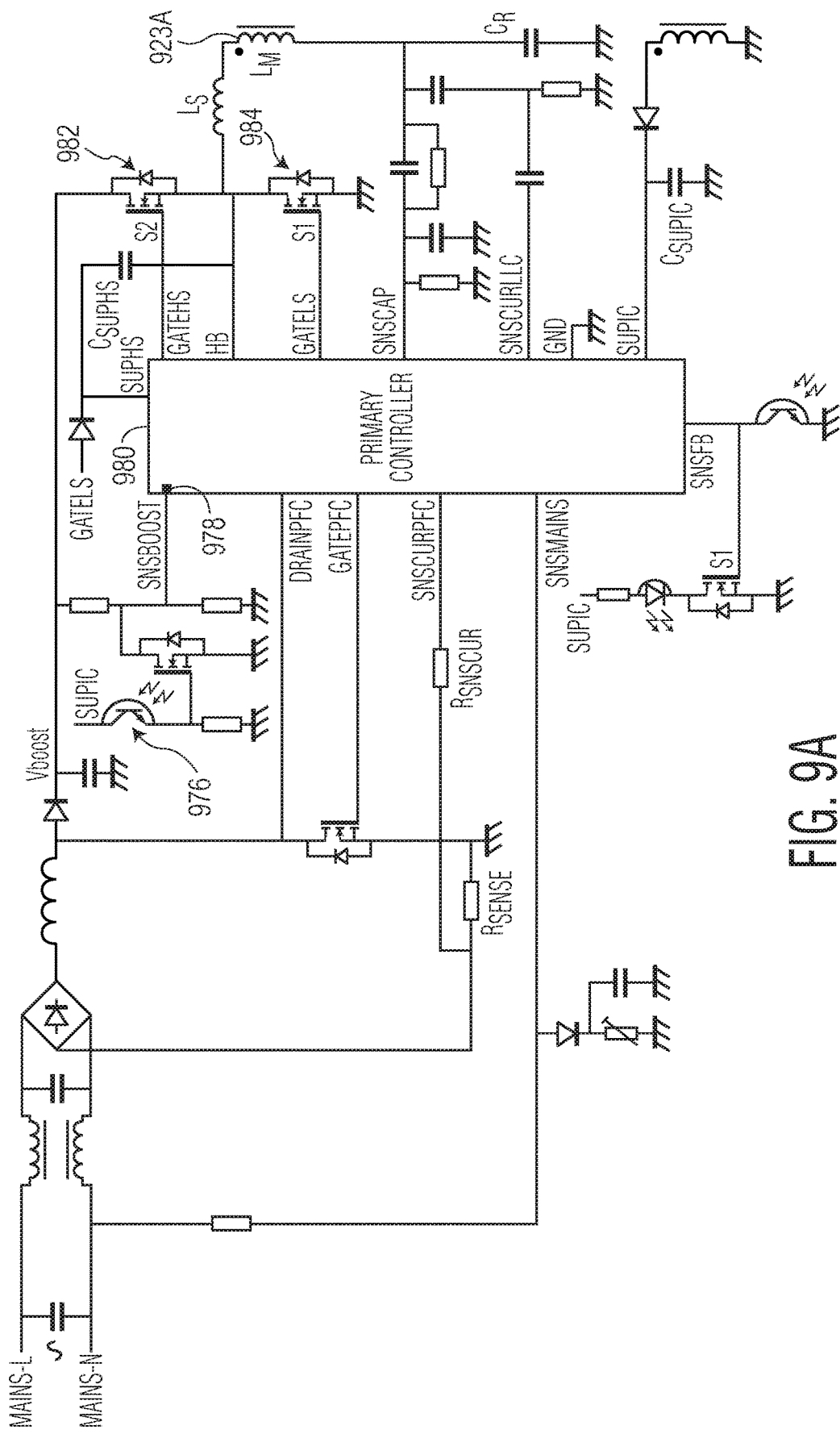
FIG. 9A shows the primary side of a SMPS.
Figure 9B:
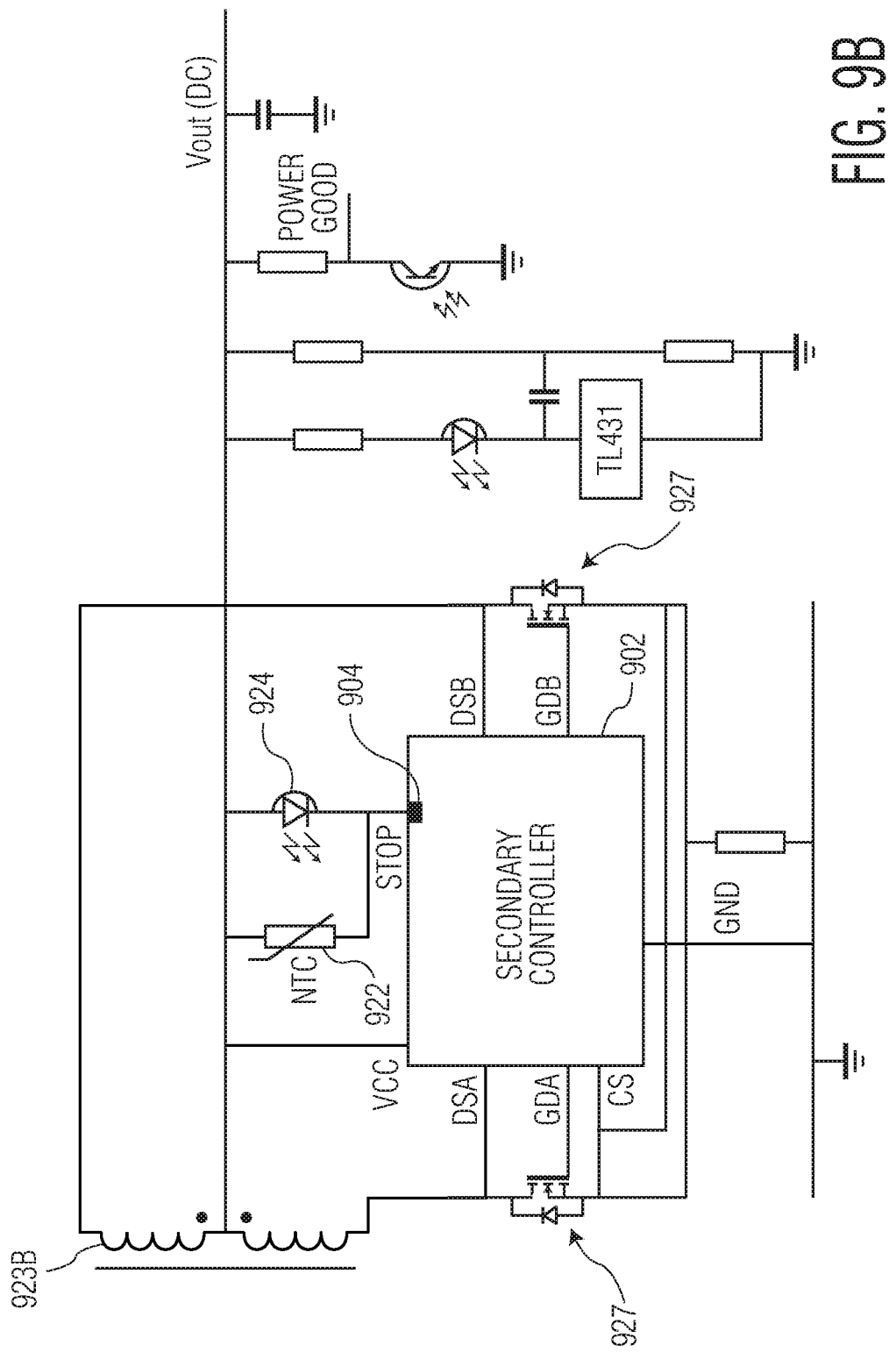
FIG. 9B shows the secondary side of the SMPS, which corresponds to the primary side of FIG. 9A.

FIG. 9A shows the primary side of a SMPS. FIG. 9B shows the corresponding secondary side of the SMPS.

The SMPS has a transformer that provides galvanic isolation between the primary and secondary sides of the SMPS. The primary winding of the transformer is labelled with reference 923A in FIG. 9A. The secondary winding of the transformer is labelled with reference 923B in FIG. 9B.

A primary controller 980, on the primary side of the SMPS, provides control signals for one or more power switches 982, 984 (in this example two power switches) in order to control the power that is put into the primary winding 923A of the transformer, and therefore to control the output power at the secondary side of the SMPS. In FIG. 9, a high-side switch 982 and a low-side switch 984 are shown.

FIG. 9B shows a secondary controller 902 having a STOP pin 904. As discussed in detail above, the STOP pin 904 is connected to an NTC thermistor 922 and an LED 924 of an optocoupler. FIG. 9B also shows two synchronous rectifiers 927, which are controller by the secondary controller 902 such that they perform the functionality of the rectifier diodes of FIG. 1.

FIG. 9A shows a photo-detector 976, which is configured to receive a light signal that is emitted by the LED 924 on the secondary side of the SMPS. The photo-detector 976 is connected to a pin 978 (in FIG. 9A the SNSBOOST pin) of a primary controller 980.

When a fault signal is received at the photo-detector 976, in this example the photo-detector 976 pulls down the SNSBOOST pin 978. In FIG. 9, the photo-detector 976 is connected to an NMOS transistor in order to pull down the SNSBOOST pin 978. The primary controller 980 is configured to stop power conversion when the SNSBOOST pin 978 is pulled down, or a fault signal is otherwise received at the primary controller 980. For instance, the primary controller 980 can stop operating the high-side switch 982 and the low-side switch 984 such that no more power is put into the primary winding 923A of the transformer.

In some of the examples described above, the secondary controller 904 is configured to cause the LED 924 to emit a first-light-signal or a second-light-signal, that are modulated differently. For example they may be modulated with different intensities, or with different time-varying profiles. In such examples, the primary controller 980 can be configured to perform different redial-processes depending upon whether a first- or second-light-signal is received at the photo-detector 976. For instance, a first-remedial-process may be performed in response to receiving a first-light-signal, and a second-remedial-process may be performed in response to receiving a second-light-signal.

One example of a first-remedial-process is an auto-restart-remedial process, which may involve the primary controller temporarily ceasing power transfer until a predefined-restart-criteria is satisfied. For instance, power may be automatically restarted in response to: (i) a predetermined period of time elapsing; or (ii) when the supply voltage SUPIC at the primary side drops below an under-voltage level and 978 restarts from an under-voltage lockout state. As discussed above, the secondary controller 902 may cause the LED 924 to stop emitting a light signal once a UVLO module determines that the output voltage of the SMPS has dropped below a defined minimum level.

One example of a second-remedial-process is a manual-restart-remedial process, which may involve the primary controller ceasing power transfer until a person causes a reset of the primary controller 980. For instance, a person can temporarily remove the power supply to the primary controller 980 such that the restarting from 0V SUPIC supply voltage of the primary controller 980 causes a reset.

Figure 10:
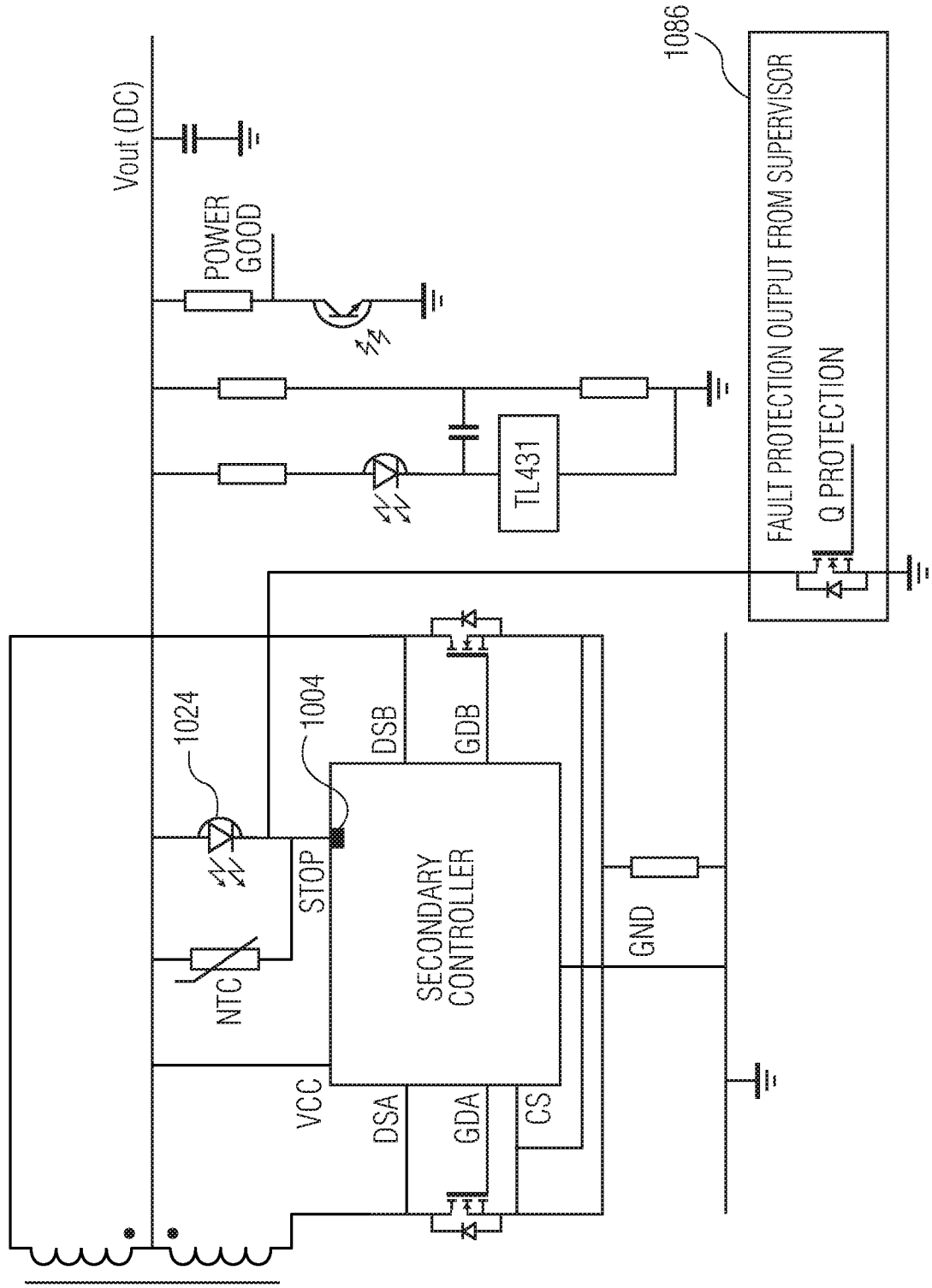
FIG. 10 shows an alternative embodiment of a secondary side of an SMPS, which can be used with the primary side of FIG. 9A.

FIG. 10 shows an alternative embodiment of a secondary side of an SMPS, which can be used with the primary side of FIG. 9A.

In FIG. 10, a supervisor circuit 1086 is shown. The supervisor circuit 1086 is also connected to the STOP pin 1004 of the secondary controller 1002. The supervisor circuit 1086 can monitor any property or parameter of the SMPS, or any component associated with the SMPS, in order to detect any appropriate type of fault. In this example, the supervisor circuit 1086 has an open drain output terminal. The open drain output terminal of the supervisor circuit 1086 is connected to the STOP pin 1004. In this way, the open drain output terminal of the supervisor circuit 1086 will pull the STOP pin 1004 down when a fault condition is detected by the supervisor circuit 1086. This will cause the secondary controller 1002 to provide a bias-current signal to the LED 1024 such that it emits a light-signal to the primary side. In this way, the connection of the supervisor circuit 1086 to the STOP pin 1004 can be considered as implementing a logical OR-function; this is because either the secondary controller 1002 or the supervisor circuit 1086, or both can pull the STOP pin 1004 down and cause a fault signal to be transmitted to the primary side.

Therefore, a further advantage of circuits described herein is that the STOP pin 1004 can also be used to provide a connection to one or more supervisor circuits 1086. Furthermore, beneficially the supervisor circuits 1086 do not need to use the same voltage domain as the secondary controller 1002 due to the high-side connection of the LED 1024 to the secondary controller 1002. Therefore, the secondary controller 1002 can represent a flexible solution that can easily and efficiently work with different types of supervisor circuits 1086, without requiring any circuitry to account for a level shift in the different voltage domains between the components.

One or more of the examples described herein can address problems that occur when the connection of an opto-coupler input requires a dedicated pin at the secondary control IC, and when the connection of an NTC thermistor requires another pin. Further problems still can occur when an additional supervisor circuit is used that also requires an additional pin. Advantageously, one or more of the secondary controllers described in this document can avoid the need for a total of 3 additional pins on the secondary controller for driving an opto-coupler, for receiving the NTC signal and for the connection to a supervisor IC. This is because the functionality of one or more of these 3 additional pins can be consolidated into a single pin. Therefore, the functionality of monitoring temperature, driving an opto-coupler and connecting with an additional supervisor IC can be combined into only 1 pin in some examples.

Examples disclosed herein can be applied in switch mode power supplies as used for chargers and adapters, and in power supplies as used for desktop computers and television sets, as non-limiting examples.

Disclosed herein is a method for monitoring a temperature at the secondary side of a power supply and signalling a fault condition to the primary side via one single pin that receives the temperature information and that transmits the fault signal. The temperature monitoring may not cause a fault signal in normal operation; the fault signal may be transmitted in response to an over-temperature condition. The fault signal can represent an over-temperature, over-voltage, over-current or over-power condition at the secondary side. An additional supervisor circuit for housekeeping of other supply domains or signals at the secondary side can be connected to the same single pin for transmitting a fault signal.

Figure 11:
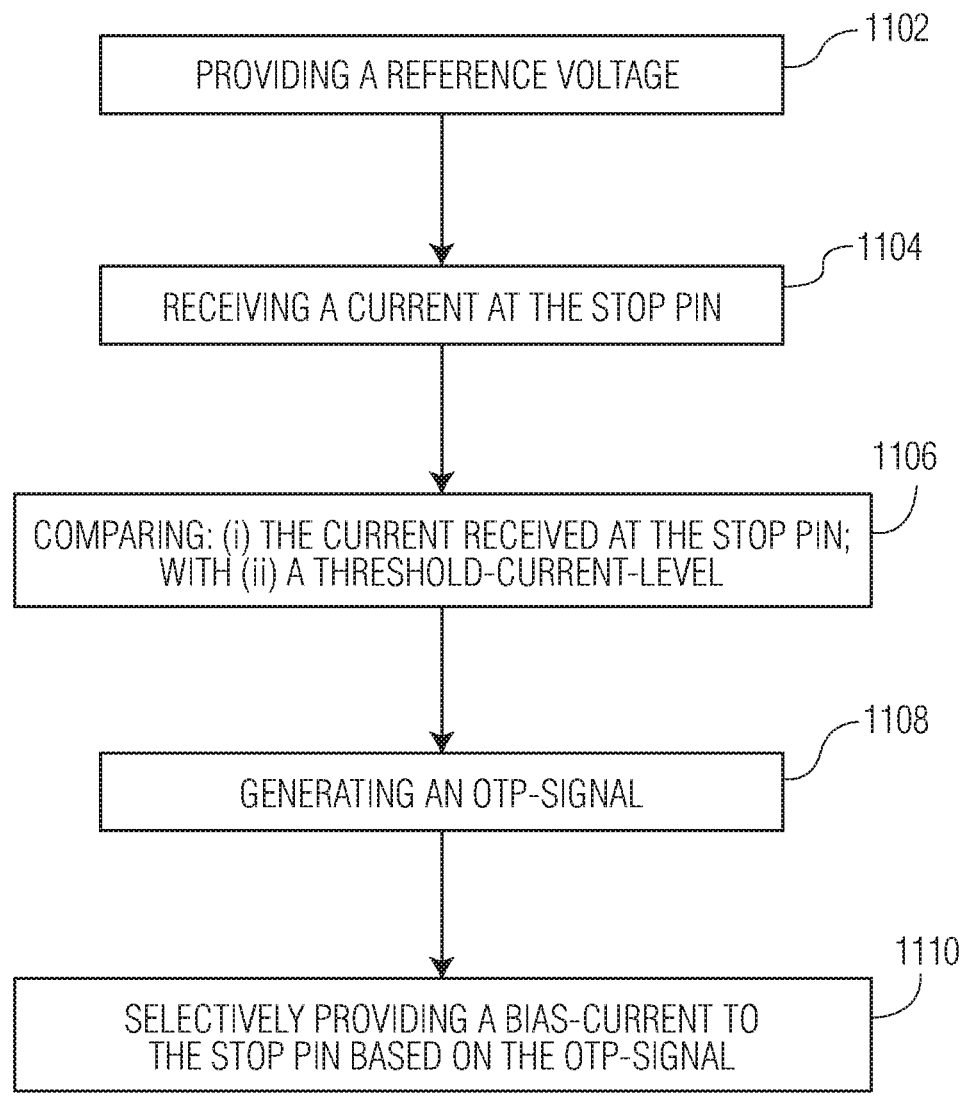
FIG. 11 shows an example process flow that can be performed by a secondary controller.

FIG. 11 shows an example embodiment of a process flow that can be performed by a secondary controller such as the ones described herein. FIG. 11 illustrates a method of operating a controller for a secondary side of a switched mode power supply At step 1102, the method involves providing a reference voltage between a STOP pin and a voltage-supply-pin of the controller. For example a reference-voltage-source such as the ones described above can be used to provide the reference voltage.

At step 1104, the method includes receiving a current at the STOP pin of the controller. The current is from a thermistor, optionally an NTC thermistor, that is connected between the STOP pin and the voltage-supply-pin of the controller. The current is due to the reference voltage that is applied across the thermistor.

At step 1106, the method involves comparing: (i) the current received at the STOP pin; with (ii) a threshold-current-level. As discussed above, this step can be performed by a current-comparator.

At step 1108, the method comprises generating or providing an OTP-signal that is representative of whether or not the current at the STOP pin is greater than the threshold-current-level. In some examples, this OTP-signal can be internal to the controller.

At step 1110, the method includes selectively providing a bias-current to the STOP pin based on the OTP-signal. The bias-current is configured to cause the LED to emit a light-signal that is representative of a fault to an associated photo-detector.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An

The invention claimed is:

1. A secondary controller for a secondary side of a switched mode power supply, wherein the secondary controller comprises:
    a STOP pin, for connecting to both: (i) a thermistor, and (ii) an LED of an optocoupler;
    a voltage-supply-pin, which is also for connecting to both: (i) the thermistor, and (ii) the LED of the optocoupler, such that the thermistor and the LED of the optocoupler are connected in parallel with each other between the voltage-supply-pin and the STOP pin;
    a reference-source, configured to provide a reference-signal between the STOP pin and the voltage-supply-pin,
    wherein the STOP pin is configured to receive a temperature-measurement-signal from the thermistor due to the reference-signal that is applied to the STOP pin by the reference-source,
    wherein the temperature-measurement-signal is representative of a resistance of the thermistor;
    an OTP-comparator configured to compare: (i) the temperature-measurement-signal received at the STOP pin; with (ii) a threshold-level, and provide an OTP-signal that is representative of whether or not the temperature-measurement-signal at the STOP pin crosses the threshold-level; and
    a switchable-current-source configured to selectively provide a bias-current to the STOP pin based on the OTP-signal, wherein the bias-current is configured to cause the LED to emit a light-signal that is representative of a fault to an associated photo-detector.

2. The secondary controller of claim 1, wherein:
    the reference-source comprises a reference-voltage-source that is configured to provide a reference voltage between the STOP pin and the voltage-supply-pin, and
    wherein the temperature-measurement-signal is a current from the thermistor due to the reference voltage that is applied across the STOP pin by the reference-voltage-source;
    the OTP-comparator comprises a current-comparator that is configured to compare: (i) the current received at the STOP pin; with (ii) a threshold-current-level, and provide the OTP-signal that is representative of whether or not the current at the STOP pin is greater than the threshold-current-level.

3. The secondary controller of claim 2, wherein the reference voltage is less than a switch-on voltage of the LED.

4. The secondary controller of claim 1, further comprising:
    a latch having a set pin and an output pin, wherein:
        the set pin is configured to receive the OTP-signal; and
        the output pin is connected to the switchable-current-source such that the switchable-current-source provides the bias-current to the STOP pin when a signal at the output pin of the latch is set.

5. The secondary controller of claim 4, wherein:
    the latch further comprises a reset pin; and
    the secondary controller further comprises an under-voltage lockout component that is configured to:
        monitor a voltage at the voltage-supply-pin, and
        provide a signal to the reset pin of the latch when the voltage at the voltage-supply-pin drops below an under-voltage-threshold level.

6. The secondary controller of claim 1, wherein
    the secondary controller is configured to receive (i) an over-current-protection, OCP, signal that is representative of an over-current condition, and or (ii) an over-voltage-protection, OVP, signal that is representative of an over-voltage condition; and
    the secondary controller farther comprises a logic block that is configured to control the switchable-current-source such that the switchable-current-source selectively provides one or more bias-currents to the STOP pin based on the OTP-signal, and one or both of the over-current-protection, OCP, signal, and (ii) the over-voltage-protection, OVP, signal.

7. The secondary controller of claim 6, wherein:
the logic block comprises an OR gate having:
   a plurality of input terminals and an output terminal, wherein the plurality of input terminals are configured to receive:
      (i) the OTP-signal; and
      (ii) one or both of the over-current-protection, OCP, signal; and the over-voltage-protection, OVP, signal;
   the switchable-current-source is configured to selectively provide the bias-current to the STOP pin based on a signal at the output terminal of the OR gate.

8. The secondary controller of claim 1,
wherein the switchable-current-source comprises a first-switchable-current-source that is configured to selectively provide a first-bias-current to the STOP pin based on:
   the OTP-signal, and
   one of: (i) an over-current-protection, OCP, signal that is representative of an over-current condition, and (ii) an over-voltage-protection, OVP, signal that is representative of an over-voltage condition.

9. The secondary controller of claim 8, further comprising:
   a second-switchable-current-source that is configured to selectively provide a second-bias-current to the STOP pin based on the other one of (i) the over-current-protection, OCP, signal, and (ii) the over-voltage-protection, OVP, signal.

10. The secondary controller of claim 9, wherein:
the first-bias-current and the second-bias-current are modulated in different ways such that the light signal that is emitted by the LED is also modulated in different ways.

11. The secondary controller of claim 10, wherein:
the first-bias-current has a first-amplitude that is configured to cause the LED to emit a first-light-signal having a first intensity,
the second-bias-current has a second-amplitude that is configured to cause the LED to emit a second-light-signal having a second intensity; and
the first-amplitude is different to the second-amplitude.

12. The secondary controller of claim 10, wherein:
the first-bias-current and the second-bias-currents are modulated with different time-varying profiles.

13. The secondary controller of claim 1, wherein:
the switchable-current-source comprises a single switchable-current-source that is configured to selectively provide one of a plurality of modulated bias-current signals to the STOP pin based on one or more of:
   the OTP-signal;
   an over-current-protection, OCP, signal that is representative of an over-current condition; and
   an over-voltage-protection, OVP, signal that is representative of an over-voltage condition.

14. A switched mode power supply (SMPS), comprising:
a secondary controller for a secondary side of the SMPS;
wherein the secondary controller includes,
   a STOP pin, for connecting to both: (i) a thermistor, and (ii) an LED of an optocoupler;
   a voltage-supply-pin, which is also for connecting to both: (i) the thermistor, and (ii) the LED of the optocoupler, such that the thermistor and the LED of the optocoupler are connected in parallel with each other between the voltage-supply-pin and the STOP pin; and
   a reference-source, configured to provide a reference-signal between the STOP pin and the voltage-supply-pin,
wherein the STOP pin is configured to receive a temperature-measurement-signal from the thermistor due to the reference-signal that is applied to the STOP pin by the reference-source;
wherein the temperature-measurement-signal is representative of a resistance of the thermistor;
wherein the secondary controller further includes,
   an OTP-comparator configured to compare: (i) the temperature-measurement-signal received at the STOP pin; with (ii) a threshold-level, and provide an OTP-signal that is representative of whether or not the temperature-measurement-signal at the STOP pin crosses the threshold-level; and
a switchable-current-source configured to selectively provide a bias-current to the STOP pin based on the OTP-signal, wherein the bias-current is configured to cause the LED to emit a light-signal that is representative of a fault to an associated photo-detector;
wherein the SMPS further comprises,
a primary side;
the secondary side;
a transformer that provides galvanic isolation between the primary side and the secondary side of the SMPS, wherein the transformer comprises a primary winding and a secondary winding;
wherein the thermistor is connected between the voltage-supply-pin and the STOP pin of the secondary controller;
wherein the LED of the optocoupler is connected between the voltage-supply-pin and the STOP pin of the secondary controller;
wherein the associated photo-detector is on the primary side of the switched mode power supply, and wherein the associated photo-detector is configured to receive the light-signal that is emitted by the LED on the secondary side of the SMPS;
one or more power switches on the primary side of the switched mode power supply; and
a primary controller that is configured to,
   provide control signals for the one or more power switches to control a power that is put into the primary winding of the transformer; and
   perform one or a plurality of different remedial-processes in response to the associated photo-detector receiving the light-signal from the LED.

15. The switched mode power supply of claim 14, further comprising:
a supervisor circuit,
wherein: the supervisor circuit is configured to monitor any property or parameter of the SMPS, or any component associated with the SMPS, in order to detect any appropriate type of fault,
an open drain output terminal of the supervisor circuit is connected to the STOP pin of the secondary controller; and
the open drain output terminal of the supervisor circuit is configured to pull the STOP pin down when a fault condition is detected by the supervisor circuit, such that the secondary controller is configured to provide the bias-current to the LED such that the bias-current causes the LED to emit the light-signal that is representative of the fault to the associated photo-detector.

\* \* \* \* \*